United States Patent
Rodriguez Serrano et al.

(10) Patent No.: US 8,014,603 B2
(45) Date of Patent: Sep. 6, 2011

(54) SYSTEM AND METHOD FOR CHARACTERIZING HANDWRITTEN OR TYPED WORDS IN A DOCUMENT

(75) Inventors: José A. Rodriguez Serrano, Barcelona (ES); Florent C. Perronnin, St. Martin d'Héres (FR)

(73) Assignee: Xerox Corporation, Norwalk, CT (US)

( * ) Notice: Subject to any disclaimer, the term of this patent is extended or adjusted under 35 U.S.C. 154(b) by 1041 days.

(21) Appl. No.: 11/847,757

(22) Filed: Aug. 30, 2007

(65) Prior Publication Data

US 2009/0060335 A1 Mar. 5, 2009

(51) Int. Cl.
*G06K 9/34* (2006.01)
(52) U.S. Cl. .................................................. 382/177
(58) Field of Classification Search .................. 382/173, 382/177, 181, 187, 190, 197, 229
See application file for complete search history.

(56) References Cited

U.S. PATENT DOCUMENTS

| | | | |
|---|---|---|---|
| 5,267,326 A * | 11/1993 | Rao .................. | 382/179 |
| 5,438,630 A | 8/1995 | Chen et al. | |
| 5,745,600 A | 4/1998 | Chen et al. | |
| 5,825,919 A | 10/1998 | Bloomberg et al. | |
| 5,841,902 A | 11/1998 | Tu | |
| 6,108,444 A | 8/2000 | Syeda-Mahmood | |
| 6,356,655 B1 | 3/2002 | Sumikawa et al. | |
| 6,917,708 B2 | 7/2005 | Goodman et al. | |
| 6,985,859 B2 | 1/2006 | Morin | |
| 7,020,338 B1 | 3/2006 | Cumbee | |
| 7,099,507 B2 | 8/2006 | Ouchi | |
| 7,698,339 B2 * | 4/2010 | Zhang et al. .................. | 707/755 |

OTHER PUBLICATIONS

Khorsheed "Recognising Cursive Arabic Text using a Speech Recognition System", proceeding of the 7*th* WSEAS international conference on automation & information, Jun. 13-15, 2006, pp. 122-125.*
U.S. Appl. No. 11/847,742, filed Aug. 30, 2007, Bressan, et al.
Bunke, H. 2003. Recognition of Cursive Roman Handwriting—Past, Present and Future. *Proceedings of the Seventh International Conference on Document Analysis and Recognition (ICDAR 2003)*.
Lowe, D. G. ISSN 0920-5691. 2004 Distinctive Image Features from Scale-Invariant Keypoints. *Int.J.Comput.Vision.* 60(2), pp. 91-110.
Madhvanath, S. and V. Govindaraju. 2001 The Role of Holistic Paradigms in Handwritten Word Recognition. *IEEE Transactions on Pattern Analysis and Machine Intelligence.* 23(2). pp. 149-164.
Marti, U. and H. Bunke. ISSN 981-02-4564-5. 2002. Using a Statistical Language Model to Improve the Performance of an HMM-Based Cursive Handwriting Recognition System. *International Journal of Pattern Recognition and Artificial Intelligence.* pp. 65-90.
Martin, A., et al. 1997. *The DET Curve in Assessment of Detection Task Performance.* pp. 1895-1898.
Rath, T. M. and R. Manmatha. ISSN 0-7695-1960-1. 2003. *Features for Word Spotting in Historical Manuscripts.* pp. 218.

(Continued)

*Primary Examiner* — Daniel Mariam
(74) *Attorney, Agent, or Firm* — Fay Sharpe LLP

(57) ABSTRACT

A method of characterizing a word image includes traversing the word image stepwise with a window to provide a plurality of window images. For each of the plurality of window images, the method includes splitting the window image to provide a plurality of cells. A feature, such as a gradient direction histogram, is extracted from each of the plurality of cells. The word image can then be characterized based on the features extracted from the plurality of window images.

27 Claims, 8 Drawing Sheets

OTHER PUBLICATIONS

Vinciarelli, A., S. Bengio, and H. Bunke. 2004. Offline Recognition of Unconstrained Handwritten Texts using HMMs and Statistical Language Models. *IEEE Transactions on Pattern Analysis and Machine Intelligence.* 26(6), pp. 709-720.

Zhang, B. and S. N. Srihari. 2003. *Binary Vector Dissimilarity Measures for Handwriting Identification.* pp. 28-38.

Rabiner, L.R., and B.H. Juang, An Introduction to Hidden Markov Models, *IEEE ASSP Magazine*, 1986.

Spitz. L.A., Using Character Shape Codes for Word Spotting in Document Images, *In Shape, Structure, and Pattern Recognition*, World Scientific, Singapore, 1995.

\* cited by examiner

SYSTEM AND METHOD FOR CHARACTERIZING HANDWRITTEN OR TYPED WORDS IN A DOCUMENT

CROSS REFERENCE TO RELATED PATENTS AND APPLICATIONS

Cross reference is made to the following application, the disclosure of which is incorporated herein in its entirety by reference:

U.S. application Ser. No. 11/847,742, filed Aug. 30, 2007, entitled FEATURES GENERATION AND SPOTTING METHODS AND SYSTEMS USING SAME, by Bressan, et al.

BACKGROUND

The exemplary embodiment relates generally to recognition of objects, such as text objects in document images and more specifically to a technique for detecting character strings (keywords) in a document image without having to detect or identify the individual characters making up the strings or the full text. The exemplary embodiment finds application in document processing, analysis, sorting, detection, word spotting, and related arts.

Text of electronically encoded documents tends to be found in either of two distinct formats, namely bitmap format and character code format. In the former, the text is defined in terms of an array of pixels corresponding to the visual appearance of the page. A binary image is one in which a given pixel is either ON (typically black) or OFF (typically white). A pixel can be represented by one bit in a larger data structure. A grayscale image is one where each pixel can assume one of a number of shades of gray ranging from white to black. An N-bit pixel can represent $2^N$ shades of gray. In a bitmap image, every pixel on the image has equal significance, and virtually any type of image (text, line graphics, and pictorial) can be represented this way. In character code format, the text is represented as a string of character codes, the most common being the ASCII codes. A character is typically represented by 8 bits.

There are many applications where it is desirable for character strings to be extracted from a document or a portion thereof which is in bitmap format. For example, a document may be available only in a printed version. In the domain of automated document processing, for example, a common task involves the categorization of documents. Many of the documents to be categorized are received in paper form, either because of their "legal" significance, as a backlog of old documents to be archived, or as general-purpose correspondence, and they need to be classified. Various techniques exist for classifying documents, whether based on the aspect of documents, on the textual content, or based on templates. All these techniques have their specific advantages and drawbacks.

By performing optical character recognition (OCR), a document in bitmap format, such as a scanned physical document, can be converted into a character code format, such as an ASCII text format, XML format including text, a format compatible with a selected word processor, or other symbolic representation. The OCR converted document can then be searched for certain keywords or other textual features to, for example, classify documents or identify documents pertaining to a particular subject. OCR has numerous advantages, but is computationally intensive. In many applications, it is not practical to apply OCR to every received document.

There are a number of applications where the identification of whole words rather than individual characters or recognition of the full text is sufficient. For example, in some applications, it may be desirable to identify documents, such as incoming mail, which include any one of a set of triggering words. These documents may then be processed differently from the rest of the mail. For example, an organization dealing with contracts may wish to identify documents which include keywords such as "termination" or "cancellation" so that such documents can receive prompt attention. Other organizations may wish to characterize documents according to their subject matter for processing by different groups within the organization.

It has been shown that identification of whole words is more robust for degraded images containing broken and touching characters. One system, based on hidden Markov models (HMMs), represents words as a concatenation of single-state character HMMs. This system requires segmentation of the characters prior to feature extraction. Another system uses multiple-state HMMs to model characters without requiring segmentation of words into characters. However, segmentation of words into sub-character segments based on stroke and arc analysis is required prior to feature extraction. In both these HMM-based systems, the segmentation can introduce errors at an early stage in processing.

A method which is able to identify whole words in a document image quickly and with a high degree of accuracy is thus desirable for a variety of applications.

INCORPORATION BY REFERENCE

The following references, the disclosures of which are incorporated herein in their entireties by reference, are mentioned:

U.S. Pat. No. 5,841,902 to Tu discloses a character recognition system which includes a character input device, such as a stylus and tablet or optical scanner, for receiving inputted characters, and a processor. The processor determines which of a number of model characters best matches the inputted character. The processor extracts a feature value vector from the inputted character and compares it to the mean feature value vector of each class of characters. The processor recognizes the inputted character as the model character corresponding to the mean feature value vector which is closest to the feature value vector of the inputted character. The processor also constructs a database from multiple specimens of each model character. The processor organizes the specimens of each model character into multiple classes. The processor then determines the mean feature value vector of each class.

U.S. Pat. No. 5,438,630 to Chen, et al. and U.S. Pat. No. 5,825,919 to Bloomberg, et al. are both directed to methods for word identification which are based on features of the entire word, without the need for segmentation or OCR, and without the need to recognize non-keywords. In the method of Chen, for example, font-independent character models are created using Hidden Markov Models (HMMs) and arbitrary keyword models are built from the character HMM components. Word or text line bounding boxes are extracted from the image. A set of features based on the word shape (and optionally also the word internal structure) within each bounding box is extracted. This set of features is applied to a network that includes one or more keyword HMMs.

BRIEF DESCRIPTION

In accordance with one aspect of the exemplary embodiment, a method of characterizing a word image is provided.

The method includes traversing the word image stepwise with a window to provide a plurality of window images. For each of the plurality of window images the method includes splitting the window image to provide a plurality of cells, extracting a feature from each of the plurality of cells, the feature comprising a gradient orientation histogram, and characterizing the word image based on the features extracted from the plurality of window images.

In accordance with another aspect of the exemplary embodiment, a method of characterizing a document image includes segmenting the document image to identify word images. For an identified word image, the word image is traversed stepwise with a window to provide a plurality of window images. For each of the plurality of window images, the method includes splitting the window image to provide a plurality of cells, extracting a feature from each of the plurality of cells, and computing a features vector for the window, based on the extracted features. The word image is characterized based on the features vectors of the plurality of window images. The document image is characterized based on the characterization of at least one of the identified word images.

In accordance with another aspect of the exemplary embodiment, a processing system includes a document segmentor which processes an input document image to identify word images and a features extractor which extracts features of an identified word image and computes features vectors therefrom. The features extractor executes instructions for traversing the word image stepwise with a window to provide a plurality of window images and, for each of the plurality of window images, splitting the window image to provide a plurality of cells, extracting a feature from each of the plurality of cells, and computing a features vector based on the extracted features. A classifier classifies the word image based on the computed features vectors of the window images.

DETAILED DESCRIPTION

Figure 1:
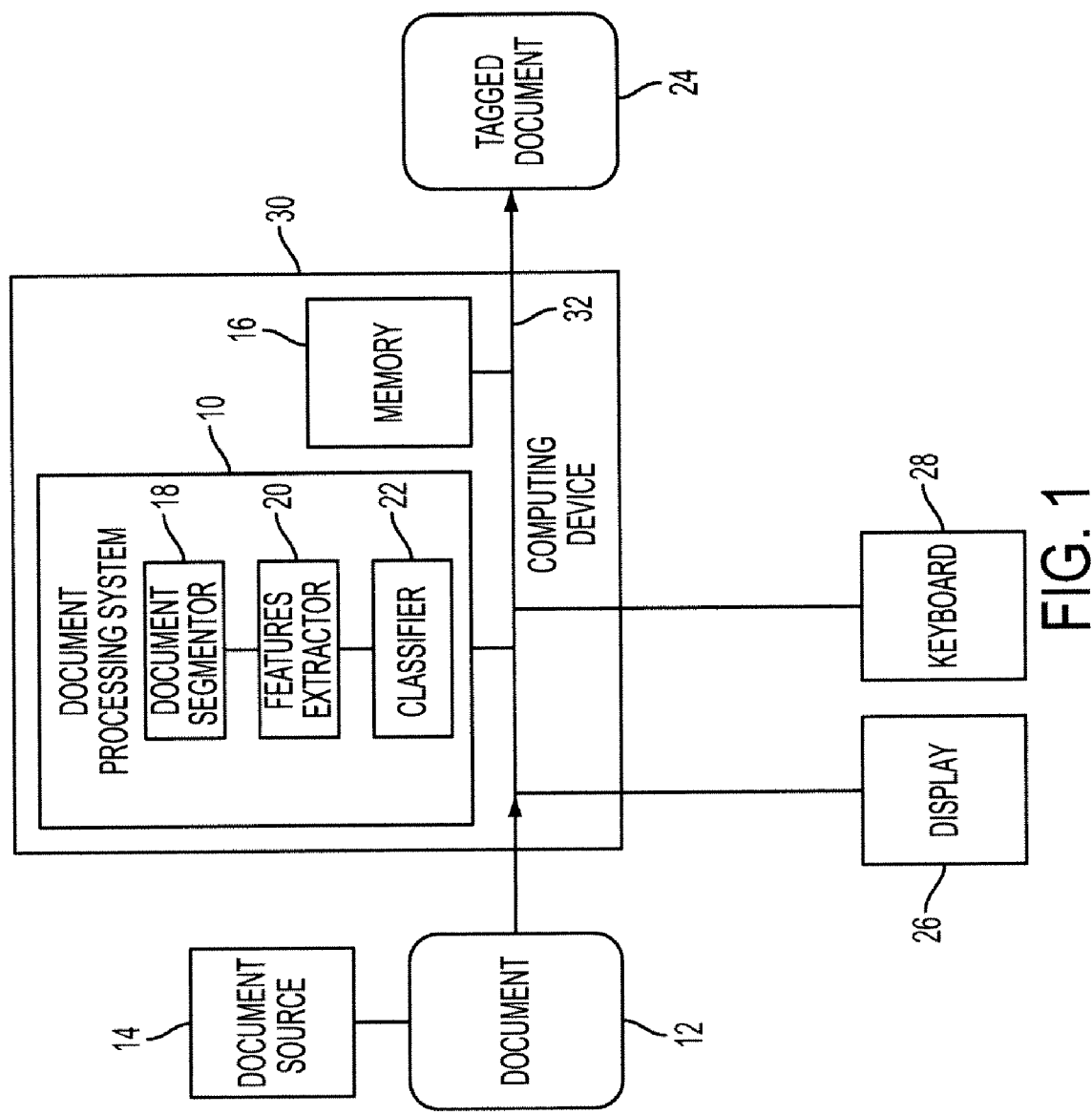
FIG. 1 is a functional block diagram of an environment in which an apparatus for processing documents operates according to a first aspect of the exemplary embodiment.

Aspects of the exemplary embodiment relate to an apparatus and method for characterizing word images (generally handwritten or typed words) in document images and to a computer program product which includes instructions for performing the exemplary method.

Methods are disclosed herein for word identification which are based on features of the entire word, without the need for segmentation into individual characters or OCR, and without the need to recognize non-keywords. In particular, a sliding window is translated across a word image. The word image is then characterized by a sequence of features vectors derived from the windows. Each features vector is derived from features extracted from a plurality of discrete cells in a given window. The sequence of features vectors may consist of a different number of features vectors from one word image to another. The word image can be mathematically classified based on the features vectors. Pattern recognition provides a variety of classifiers for data of such a nature. Examples of classifiers include Hidden Markov Models and those which employ dynamic time warping, string matching, and the like. Based on the classification, a determination may be made as to whether the word image corresponds to a given keyword which a classifier has been trained to identify.

One application of the exemplary apparatus and method is the automated identification of specific keywords in documents, and flagging documents based on the keyword or keywords identified for further processing according a predetermined procedure. For example, in the context of classification of incoming mail, documents which are determined to include certain keywords such as "termination" or "cancellation" may be automatically flagged for prompt processing in advance of documents for which none of the predefined keywords are identified. In the context of segregation of documents according to content, the presence of a particular keyword or keywords may be used to direct the document to a particular recipient. For example, one of a plurality of recipients may be designated to receive documents which are determined to include a first keyword and another recipient may be designated to receive documents determined to include a second keyword. For example, a government organization may include a department of the environment and a justice department. A set of environment related keywords may be defined which are most specific to the types of documents of interest to the environment department, such as "environment," and "biodiversity," or groups of keywords, such as "global warming" and "climate change". A different set of keywords may be defined for the justice department, such as "justice," "law enforcement," and so forth. Documents identified as including environment-related keywords (or a preponderance of environment-related keywords), for example, may be initially routed to the environment department, where a human observer may confirm the document has been properly routed. Alternatively or additionally, documents in which keywords have been identified may be subjected to more rigorous automated processing, such as OCR.

Word spotting refers generally to the task of detecting the presence of certain words without directly using recognition techniques. As will be appreciated, the exemplary embodiment finds application in a variety of word spotting and other document processing contexts and is not limited to the applications described herein.

The exemplary embodiment is discussed in the context of binary images. In this context, the term "image" refers to a representation of a two-dimensional data structure composed of pixels. A binary image is an image where a given pixel is either "ON" (active) or "OFF" (inactive). Pixels are generally defined to be active if they are black and inactive if they are white. It should be noted that the designation of black as ON and white as OFF reflects the fact that most documents of interest have a black foreground and a white background. It is to be appreciated that the exemplary method is not limited to black and white images but is appropriate to images of any suitable color separation or separations. Negative images may be converted to positive images, if desired, prior to processing.

Word images are generally images of single (or sometimes multiple) words and/or numbers comprising typed or handwritten text. Each word image may comprise a character string comprising a group of characters, such as letters and/or numbers) which are sufficiently closely grouped together to allow the word image to be distinguished from other word images in the document. The character strings to be identified are generally known words in a particular natural language, such as English or French. However, it is to be appreciated that word images may also comprise logos and any other recognizable representation which can be reliably extracted from a document image as a discrete image.

With reference to FIG. 1, an exemplary environment in which a processing system 10 for characterization of word images in documents operates is shown. The processing components of the system 10 are best understood with reference to FIG. 2, which illustrates an exemplary method for characterization of word images. Accordingly, the operation of these components will be described only briefly here.

Documents 12 to be processed by system 10 are received from a suitable source 14 of such documents, such as a scanner, camera, data storage device, or the like. Each document 12 may comprise one or more digital pages, each page comprising one or more images, such as binary images. In one aspect of the exemplary embodiment, the documents 12 to be processed comprise scanned images of physical documents which include text that may be typed or handwritten (e.g., in cursive script), such as correspondence. During processing, document images and word images may be stored in memory storage media 16, incorporated into or otherwise accessible to the system 10. The system 10 includes a document segmentor 18 which processes a document image to identify word images, generally by identifying clusters of active pixels which are surrounded by inactive pixels. The segmentor 18 operates without consideration of the individual characters which form the word image. A word image can thus comprise any object within a document image, such as a word, numbers, a company logo, combination thereof, and the like, which is capable of being identified as a discrete entity by the particular segmentation techniques being used.

A features extractor 20 extracts features of an identified word image and computes features vectors therefrom. In particular, the features are extracted from cells of a sliding window, traversed stepwise across the word image, as described in greater detail below. A classifier 22 may be used to compute whether a match exists between a word image, as characterized by its features vectors, and one or more of set of predefined keywords. The classifier is generally trained on features vectors that are extracted in a similar manner from one or more of word images of a given keyword that is sought to be identified, where present in the document. The classifier 22 may comprise multiple classifiers, one for each of a set of keywords, and may employ information stored in memory 16.

The documents 12 processed by the system 10 may be tagged, e.g., with XML tags, which identify the keyword(s) present, optionally their locations in the document, and/or other information based on the keywords identified, such as a classification of the overall document. The classification of the document may be used to determine the routing of the document or whether it will undergo further processing, such as OCR. The tagged documents 24 may be then output by the system 10. In one embodiment, processor 10 communicates with a display 26, for displaying an image of the document. The illustrated display 26 can be a liquid crystal display (LCD), a plasma display, a cathode ray tube (CRT) display, a projection display, or the like. The document image may be highlighted or otherwise modified to indicate any keywords identified by the processor 10, e.g., for verification by a person using a suitable user input device 28, such as a keyboard, keypad, trackball, touch screen, voice recognition input device, or the like.

Processing system 10 may be hosted by any suitable computing device 30 that is capable of processing data, such as a general purpose computer, e.g., a desktop or laptop computer or a PDA or the like. Alternatively the host computer may be a dedicated computing device. The various components of the computer 30 may be all connected by a bus 32.

Each of the processing components 18, 20, 22 may be in the form of software, hardware, or both. The processing components 18, 20, 22 of processing system 10 may execute instructions, stored in memory 16 or elsewhere, for performing the exemplary method described with reference to FIG. 2. While the system 10 is shown as having three processing components 18, 20, 22, it is to be appreciated that two or more components may be combined or a component divided into two or more components. Components 18, 20, 22 may all be resident in computing device 30 or may be otherwise accessible thereto.

Memory 16 can include random access memory (RAM), read-only memory (ROM), a hard disk, optical disk, or so forth and may be all physically located in the computing device or parts thereof may be accessible to the computing device, e.g., via a local area network or the Internet. The memory 16 may store data, including a document 12 and software for performing analysis and markup of the document. The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
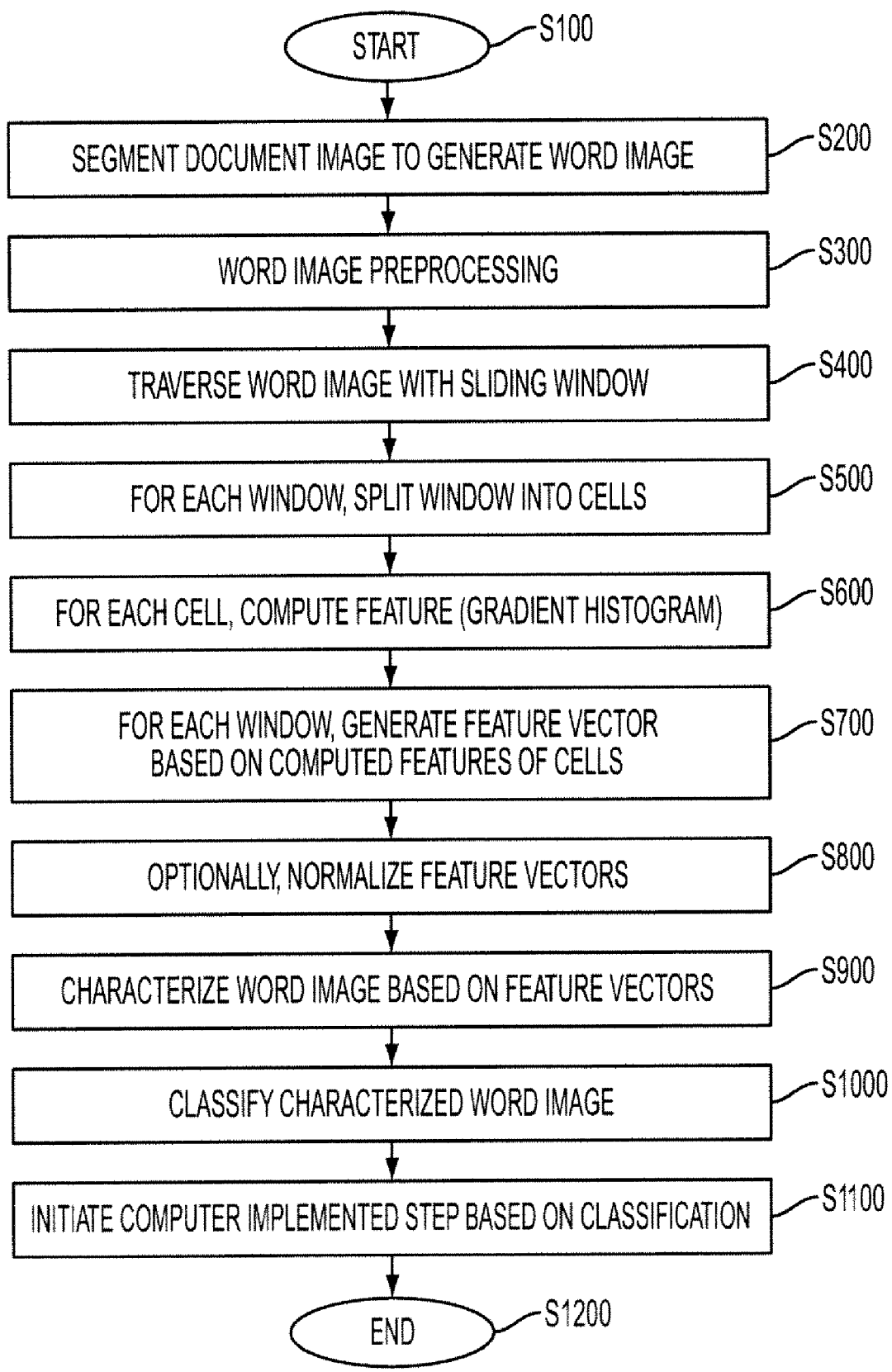
FIG. 2 illustrates an exemplary method for processing documents which may be performed with the apparatus of FIG. 1 in accordance with a second aspect of the exemplary embodiment.

Having described an exemplary system for processing documents, a method which may be performed with the exemplary system will now be described. FIG. 2 illustrates steps in an exemplary method for text recognition in document images. It is to be appreciated that the method may include fewer, more or different steps from those illustrated and need to proceed in the order illustrated. Briefly, the method proceeds as follows.

The method begins at S100. S200 includes optically reading a handwritten or typed word so as to form an image representation thereof (a word image) comprising a bitmap of pixels.

At S300, the acquired word image may be subjected to one or more pre-processing steps. These pre-processing steps may include normalizing the size of the word image such that two word images of the same word will have approximately the same normalized length (and thus generate approximately the same number of windows).

At S400, a sliding window is traversed stepwise across the word image. In general, for Roman cursive handwriting or typed text, a rectangular sliding window is moved from the left to the right of the word image. In particular the window starts at a position which encompasses a first end of the word image (generally expected to be the start of a word) and moves in a plurality of steps to a position which encompasses the second end of the word image (generally expected to be the end of the word). For processing of documents that use languages which normally extend in right to left or top to bottom directions, the window can follow the particular direction.

At each step, at least a portion of the window is subdivided, either regularly or irregularly, into cells (S500).

S400 and S500 are repeated a plurality of times until the word image is traversed.

At S600, features are computed for at least a plurality of the cells of the window. In particular, at each position of the sliding window along the word image, a histogram of gradient directions is computed for each cell.

For each position of the sliding window along the word image, a features vector characterizing the window is formed from the computed features, e.g., by concatenating the histograms of gradient directions (S700). Optionally, each features vector may be normalized (S800) so that the sum of the components is a fixed value, e.g., 1.

At S900, the word image is characterized based on the computed (and optionally normalized) features vectors. In the exemplary embodiment, the word image is characterized by a set of normalized features vectors.

At S1000, the characterized word image may be classified using a classifier. The method may return to S400 and steps S400 to S1000 repeated for each word image identified in the document.

At S1100, a computer implemented step may be automatically initiated, based on the characterization/classification of the word image. The method ends at S1200. Further details of the steps outlined are provided below.

In the exemplary embodiment, a word image (handwritten or typed) is mathematically characterized by a sequence of features vectors. The sequence may consist of a different number of features vectors from one word image to another. Pattern recognition techniques may then be applied to the feature vectors to determine whether the word image corresponds to a given keyword. A variety of classifiers for data of such a nature may be employed, such as hidden Markov models, dynamic time warping, string matching, etc. The feature choice can have a dramatic impact independently of the classifier. The features vectors generated by the exemplary method have been shown to improve significantly the performance of a handwritten word spotter, as compared to conventional word spotting techniques.

Figure 3:
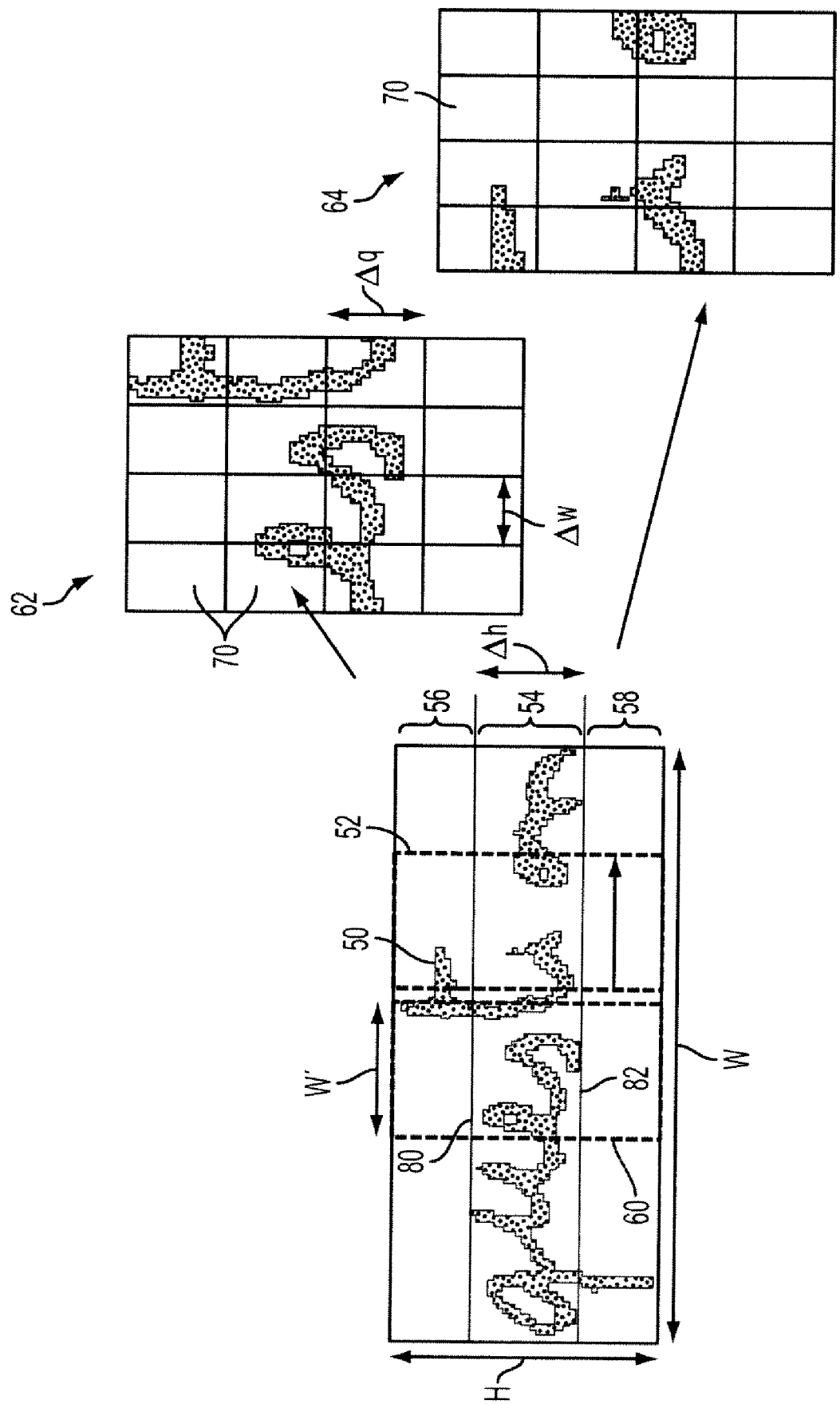
FIG. 3 illustrates an exemplary word image for the handwritten word "question" and a sliding window in process of traversing the word image.

With reference to FIG. 3, an exemplary word image 50 of the handwritten word "question" is shown for purposes of illustrating aspects of the exemplary embodiment. The word image 50 is entirely contained within an imaginary bounding box 52, which is the smallest rectangle within which the word can be fitted. Words can be defined in terms of a main body portion 54 of height $\Delta h$, an ascender portion 56, above the main body portion, and a descender portion 58, below the main body portion. In these latter two regions 56, 58, which are not, of course, present in all words, the tails of some letters, such as in the lower case letters t and q in the word "question", would normally be found.

Generating Word Images

In S200, an image of a document to be processed may be captured by a sensor, such as a scanner or camera. Word images, generally corresponding to words in the captured image, are then extracted as a series of tokens. A bounding box 52, which is the minimum sized rectangle required to enclose the word image 50 is generally defined in this step.

One method for generating word images may include a thresholded reduction and morphological closing of the image data to cause the individual characters in words to merge together, while preserving the interword spacing. Such techniques for identifying word images are described, for example, in U.S. Pat. Nos. 5,438,630; 5,745,600; and 5,825,919, the disclosures of which are incorporated herein in their entireties by reference. More sophisticated methods may include identifying lines of handwriting through projection profile analysis. The minima of the projection profile give the positions of the line splits. Individual words on each identified line are then identified. In particular, word hypotheses are extracted by analyzing the gaps between connected components. In theory, large gaps are more likely to correspond to word gaps while smaller ones correspond to character gaps. Further details of such techniques for identifying word images are given in U. Mahadevan and R. C. Nagabushnam, "Gap metrics for word separation in handwritten lines," in Third International Conference on Document Analysis and Recognition (ICDAR'95), vol. 01, (Los Alamitos, Calif., USA), p. 124, IEEE Computer Society, 1995; and K. Takru and G. Leedham, "Separation of touching and overlapping words in adjacent lines of handwritten text," in Proceedings of the Eighth International Workshop on Frontiers in Handwriting Recognition (IWFHR'02), (Washington, D.C., USA), p. 496, IEEE Computer Society, 2002.

Preprocessing:

The preprocessing step (S300) may include image processing of the document image 12 or word image 50 and may include one or more of the following:

1. Binarization: In this step, the image is converted from a grey level image to a binary mage. A number of algorithms are available for this step, as described, for example, in BUNKE, H., Recognition of cursive Roman Handwriting—Past, Present and Future, in *Proc. of the Seventh International Conf. on Document Analysis and Recognition* (ICDAR) (2003), and references cited therein (hereinafter "Bunke").

2. Smoothing: Smoothing techniques attempt to remove noise. In one method a Gaussian filter with a standard deviation σ is applied to the word image, as described, for example, in RATH, T. M. and R. MANMATHA, ISSN 0-7695-1960-1, Features for Word Spotting in Historical Manuscripts, pp 218 (2003). Other smoothing techniques include vertical and horizontal morphological closing operations, which generally remove black shapes which smaller than a predetermined approximate size. Other techniques for smoothing are described, for example, in U.S. Pat. No. 6,091,859 to Sonobe, et al., the disclosure of which is incorporated herein by reference in its entirety.

3. Correction of the skew (deviation of the baseline from the horizontal direction and correction of the slant (deviation of average near-vertical strokes from the vertical direction. The slant and slope are introduced by the different writing styles of individual writers in cursive writing. Both corrections can reduce handwritten word shape variability. Techniques for performing these corrections are described, for example, in Bunke.

4. Normalization of the word images: In this step, the height of each word image 50, is normalized. In the normalization step, the height Δh of the main body (or core region) 54 of the word may be normalized to a fixed number of pixels. In one aspect, the height Δh of the main body is normalized to about 10-30 pixels, e.g., about 18 pixels. Since the main body height Δh is approximately proportional to the width of an individual character in the character string, normalization helps to generate word images with a length which is approximately proportional to the number of characters in the string.

Sliding Window:

Referring to FIG. 3, assuming an image I(i,j) is of height H and width W, where i and j are, respectively, the row and column indices, such as word image 50. At each column j, a window 60 of height H and width W' is centered. The window 60 is moved stepwise across the word image, e.g., by one column at a time. At each new window position, a features vector is computed that depends only on the pixels inside the window 60. Thus, a sequence of W features vectors is obtained at S700. This way of obtaining the sequence is independent of the particular way of computing the features vectors.

In the exemplary embodiment, the window 60 moves from left to right by 1 pixel generating a features vector output at each position. In an alternative embodiment, the window may move by an amount S which may be greater than 1 pixel. One advantage of this sliding window approach is that it preserves the left-to-right nature of the writing. Two window images 60, 62, generated in the sequence are illustrated by way of example in FIG. 3.

The width W' of the window 60, which is generally less than the width of the word image W, may be selected to be approximately equal to or somewhat wider than the average anticipated width of a character. For example, W' may be approximately 1-3 characters in width. There is no need to make an accurate determination of character width. For example, the character width can be assumed to be proportional to the normalized value of Δh. For example, W' may be from about 0.7 to 2 times Δh in pixels. In general W' may be selected to be less than about H, since the width of a character is typically less than the height of the bounding box 52. In the exemplary embodiment, W' may be about 30 pixels. An appropriate value for W' can be determined through experimentation. In general, the same value of W' is employed for all of the word images in the document.

Prior to sliding of the window 60, any column j of the word image 50 in which there are no active pixels (i.e., the entire column is white) may be eliminated from the word image to facilitate processing of the data. It has been found in practice, that removing columns in which all pixels are inactive improves the results.

Window Split:

At every step of the sliding window 60, the entire window image 62, or at least a portion thereof containing the active pixels, is split into a plurality of imaginary cells 70, such as from two to 64 cells. The exemplary cells are rectangular, are not overlapping, contiguous, and form an M×N array where N is the number of cells arranged in a horizontal direction and M is the number of cells arranged in a vertical direction. However, in place of rectangles the cells may assume other regular shapes capable of forming a contiguous array, such as triangles or hexagons. In yet other embodiments, the cells may be overlapping.

M×N≧2 and in general, M×N≧4. M and N can independently be, for example, at least 2 and in one embodiment, N and M are both at least 3. N and M can independently be up to about 10 or more. Each cell 70 typically contains at least 20 pixels and in general, at least about 40 pixels. When Δh is normalized to about 18 pixels, for example, N is conveniently about 4 and M from about 4 to 6. Exemplary window images 62, 64, for example, shows a 4×4 array of cells 70. At each step, the sliding window is subdivided into the same number of cells, i.e., N and M each have the same value for each window position. In general, the cells of the windows all have the same width Δw. However, the cells 70 of different window images may have different heights Δq.

Figure 4:
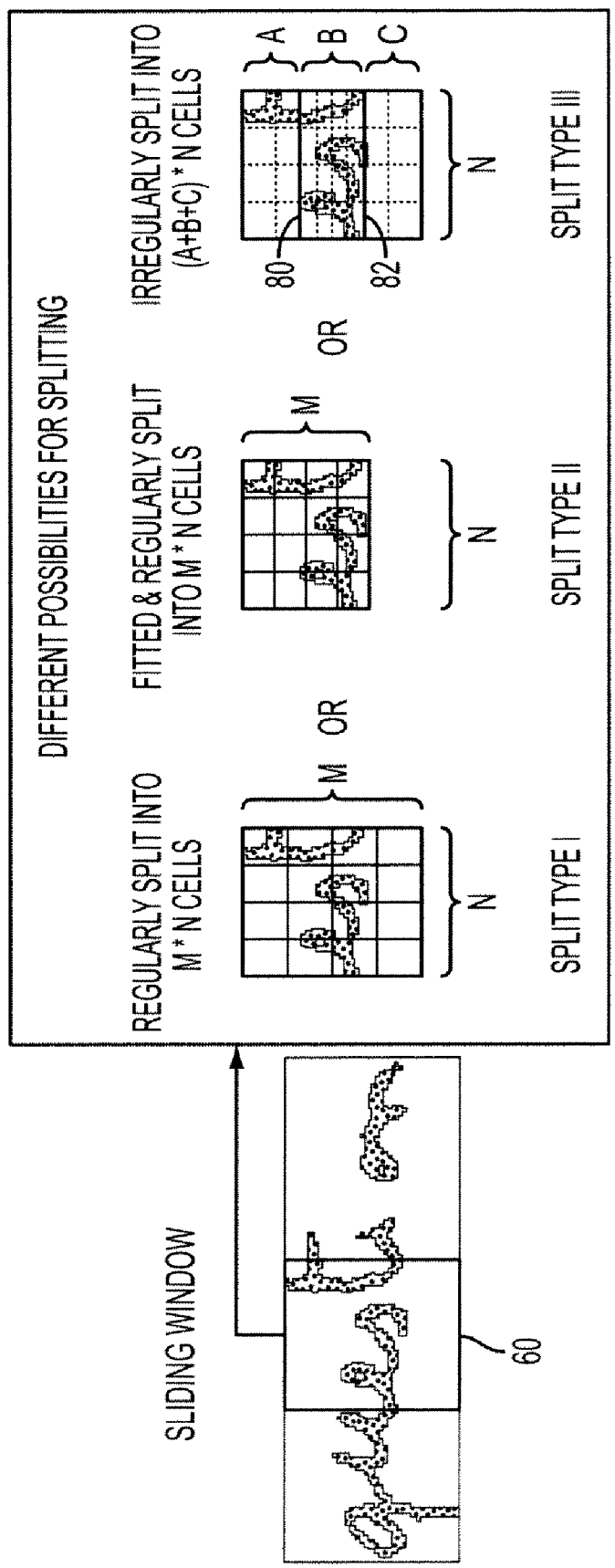
FIG. 4 illustrates exemplary methods for splitting a sliding window into an array of cells.

Different methods can be employed for this subdivision, as illustrated in FIG. 4:

Split Type I: This is the simplest method of subdivision and involves splitting the window regularly into M×N cells of identical dimensions.

Split Type II: In this method, the M×N split is performed only on the rectangular area of the window containing active pixels. Thus, for example as shown in FIG. 4 for a window containing the letters est which have no portion in the descender area, this region of the window can be excluded and the remaining portion may be split into equal sized cells.

Split Type III: In this method, (A+B+C)×N cells are generated, where A is the number of cells and hence A−1 is the number of vertical splits in the ascender area 56, B is the number of cells and hence B−1 is the number of vertical splits in the core area 54 and C is the number of number of cells and hence C−1 is the number of vertical splits in the descender area 58 of the sliding window. Here M=A+B+C, where A and C can each be for example 1 and B can be, for example, at least 1, e.g., at least 2, such as 4 in the illustrated embodiment. The areas 54, 56, 58 may be previously determined by obtaining the positions of the so-called "upper line" 80 and "base line" 82, which define the core region 54 therebetween, by employing standard techniques. One rationale for using a different number of splits in each of the three zones 56, 54, 58 is that the ascender, descender and main body zones carry different information and thus it is reasonable to treat them differently. As noted above, the distance between the base line and upper line is Δh and in one embodiment, an image is first rescaled to force a previously fixed Δh.

It has been found that in practice, the split type II gives good results.

Gradient Histogram Computation:

In each of the cells 70, features are extracted (S600). The exemplary features are gradient orientation histogram features. In particular, a gradient orientation histogram is computed for each cell based on all the pixels in the cell. As noted above, the image may been previously convolved with a smoothing filter, such as a Gaussian one with standard deviation σ, resulting in a smoothed image comprising image data L. Otherwise L may represent the original image or the image as pre-processed in some other way.

First, horizontal and vertical gradients $G_x$ and $G_y$ are computed for each pixel, using standard methods. The gradients represent the approximate variation in pixel values, e.g., gray scale value, which is occurring in the region of the pixel in mutually orthogonal directions. One method for computing the gradients is:

$$G_x = L(x+1,y) - L(x-1,y)$$

$$G_y = L(x,y+1) - L(x,y-1)$$

Here, the values for the two adjacent pixel positions are used to compute the gradients, although it is to be appreciated that a smaller or wider span of pixels may be employed. For a binary image L, at any pixel location x, y, the L may assume a value of 0 or 1 (maximum). So the only possible values of $G_x$ and $G_y$ are +1, 0 and −1. However, if the image has been previously smoothed, elements of L are positive real numbers and elements of G are real numbers.

Gradient magnitude m and direction θ are then obtained for each pixel with coordinates (x,y) in L as:

$$m(x, y) = \sqrt{G_x^2 + G_y^2}$$

$$\theta(x, y) = a\tan2\left(\frac{G_y}{G_x}\right),$$

where atan2 is a function that gives the angle of the vector $(G_x, G_y)$ in the range $[-\pi,\pi]$. It takes into account the arctangent of $G_y/G_x$ and the signs of both components. The particular implementation is the atan2 function in C++.

Then, in each of the cells 70, an orientation histogram is computed. Specifically, the $[-\pi,\pi]$ interval is quantized into T bins. The orientation histogram for a cell is the accumulation of the contribution of each pixel contained in this cell. In one embodiment, each pixel (x,y) of the cell with gradient direction θ(x,y) contributes to one (or multiple) bin(s) as a function of:

its angular distance to the bins
the magnitude m(x,y) of the gradient vector.

Figure 5:
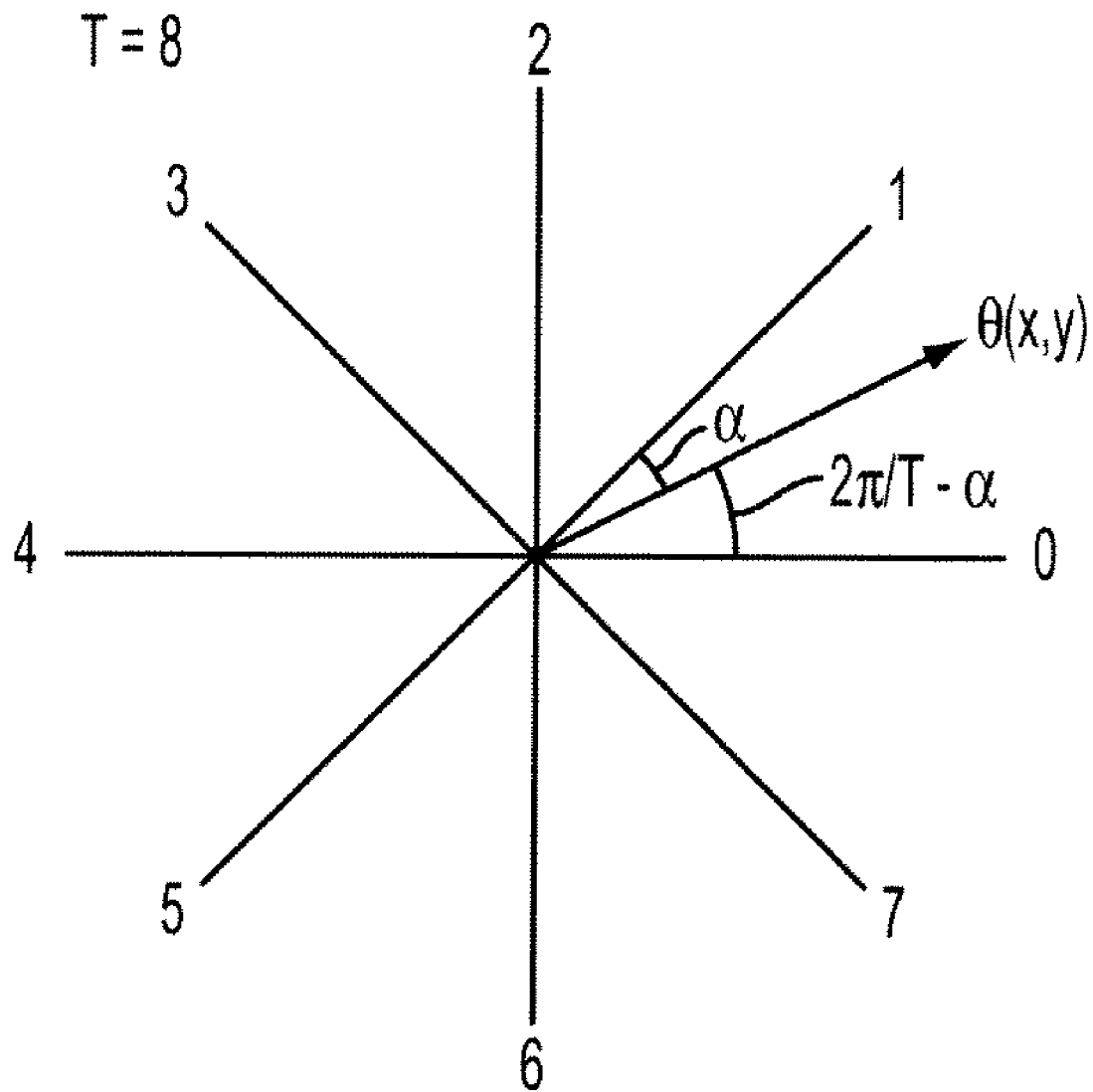
FIG. 5 illustrates the contribution of a pixel to adjacent bins of a histogram comprising 8 bins.

T may be, for example, from about 4 to 12, such as 8. In one embodiment, each pixel contributes to the two closest orientation bins. The contribution depends linearly on the angular distance between θ(x,y) and the two bins. For example, let α and $$\frac{2\pi}{T} - \alpha$$

denote the angular distance to the two closest bins for a particular pixel (FIG. 5 illustrates an example where T=8 quantized directions). Then the contribution of this pixel to the two bins is respectively:

$$m(x, y)\left[1 - \frac{T\alpha}{2\pi}\right]$$

and $$m(x, y)\frac{T\alpha}{2\pi}$$

As the sum of the angles to the two closest bins is $2\pi/T$, when the gradient angle is very close to a bin, its contribution to that bin approaches m(x,y) and its contribution to the second-closest bin approaches 0. If θ is equidistant to the two bins then $$\alpha = \frac{\pi}{T}$$

and the pixel contributes to each bin by an amount m(x,y)/2.

In alternative embodiments, only the closest bin may be considered (which tends to be less robust to noise) or a Gaussian-weighted circular window may be employed (which tends to be more robust to noise but can be more complex).

Figure 6:
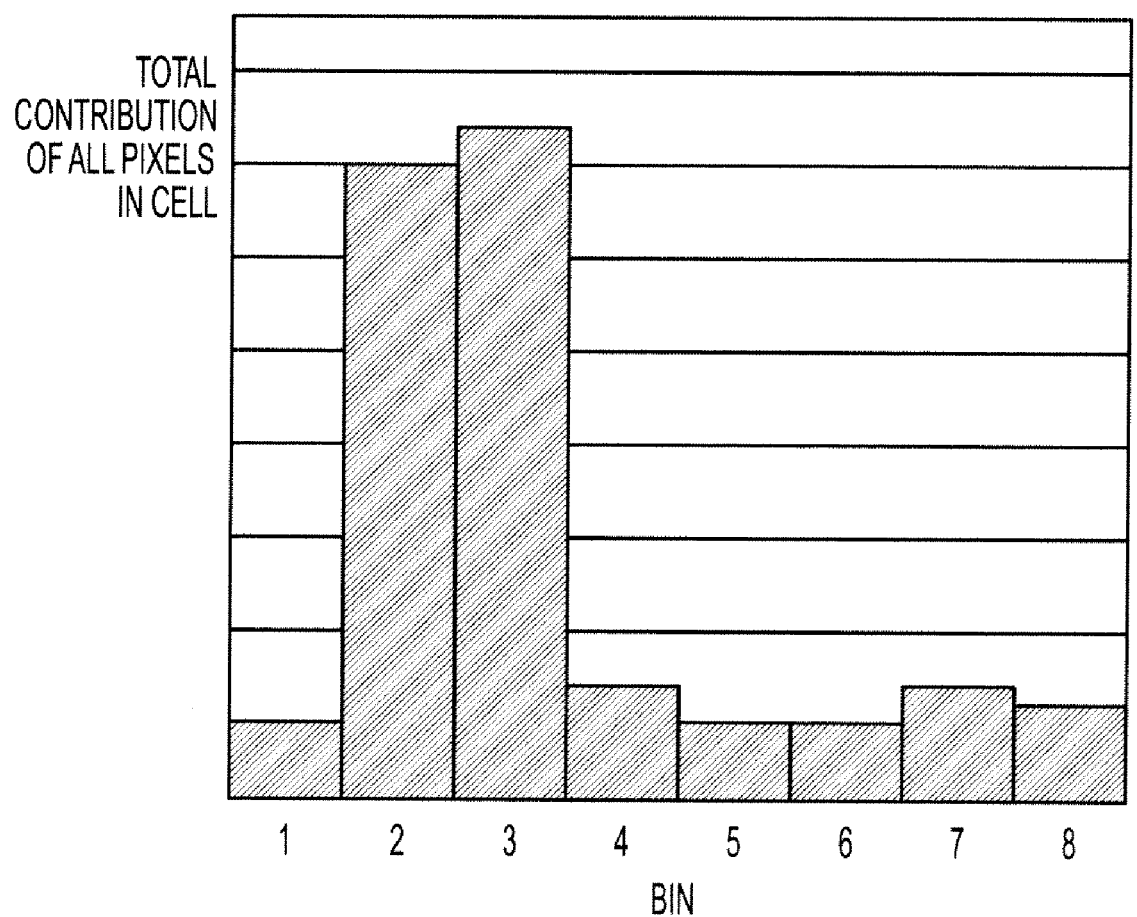
FIG. 6 graphically illustrates an exemplary histogram generated for a cell.

As previously noted, a gradient direction histogram is computed for each cell of the window image at S600. FIG. 6 graphically illustrates such a histogram. The process is repeated at each position of the sliding window. To avoid boundary effects, it is assumed that the pixel values are 0 outside the image (e.g., for those windows centered on one of the beginning or ending columns j). Each gradient histogram constitutes a feature of the particular cell for which it is generated.

At S700, a features vector of each window is derived from the features of the cell. In the exemplary embodiment, the features vector may simply be the concatenation of the gradient histograms computed in each cell.

In the exemplary embodiment, the contribution of pixels to the histogram generated in S600 does not depend on the pixel position. In alternative embodiments, positional weights can be given to the pixels, e.g., as a function of the horizontal distance of the pixel to the window center, and/or as a function of the pixel distance to the center of the respective cell.

Normalization

A normalization can be subsequently applied to increase the robustness of the features (S800). The normalization step may include scaling the components of the features vector so that the sum of the components is a fixed value, such as 1.

To summarize, if in each window there are M×N cells and each cell is represented by a histogram of T bins, each position of the sliding window is thus characterized by a features vector of M×N×T dimensions. For example, when M and N are both 4 and T is 8, the features vector comprises 128 values. The word as a whole is characterized by the W different features vectors of that kind.

Table 1 summarizes parameters on which the exemplary features depend and exemplary default values.

TABLE 1

| Parameter | Description | Default |
| --- | --- | --- |
| A | Number of vertical splits in the ascender area (Split type III, irregular grid) | 1 |
| B | Number of vertical splits in the main body area (Split type III, irregular grid) | 4 |
| C | Number of vertical splits in the descender area (Split type III, irregular grid) | 1 |
| M | Number of vertical splits (Split types I and II, regular grid) | 4 |
| N | Number of horizontal splits (all Split types) | 4 |
| S | Step of the sliding window, in pixels | 1 |
| W' | Width of the sliding window, in pixels | 30 |
| T | Number of orientation bins in the gradient direction histogram | 8 |
| σ | Sigma of the Gaussian smooth previously applied to the image | 2 |
| Δh | Distance between upper and baseline, in pixels | 18 |

The set of features vectors (optionally normalized) thus obtained for a given word image characterizes the word image. The characterized word image can classified with a classifier 22 to determine if there is a match (S900). The classifier has been trained on previously characterized word images from a training set. In one embodiment, the classifier employs hidden Markov models (HMMs) which are trained on characterized word images for a set of keywords using the same default settings. The trained HMM is then applied to the characterized word image 50. In general, an HMM models a keyword as a sequence of states, each state modeling a part of the word. The HMM generates a score for each word image depending on how likely it is to be the searched word. If the score is at or above a predetermined threshold, a decision is made that there is a match. Alternatively, the classifier 22 may output confidence measures for each of a plurality of keywords in a predetermined lexicon. The results for several keywords may thus be used to characterize the word image or the document as a whole.

The procedure of classifying the characterized word images using HMMs are generally well understood and can be performed using the techniques described, for example, in Bunke or in the following references: VINCIARELLI, A., S. BENGIO, and H. BUNKE, Offline Recognition of Unconstrained Handwritten Texts using HMMs and Statistical Language Models, *IEEE Transactions on Pattern Analysis and Machine Intelligence*, 26 (6), pp 709-720 (2004); MARTI, U. and H. BUNKE, ISSN 981-02-4564-5, Using a Statistical Language Model to Improve the Performance of an HMM-Based Cursive Handwriting Recognition Systems, *International Journal of Pattern Recognition and Artificial Intelligence*, pp 65-90 (2002) (hereinafter, "Marti and Bunke"); among others. Other classification techniques which may be used include dynamic time warping, string matching, and the like. As will be appreciated, the method is not limited to any particular type of classification or other analysis of the characterized word image. The document 12 may be tagged with tags, such as XML tags, to indicate the keyword(s) identified therein.

Based on the classification, a computer implemented process may be initiated (S1100). This step may include routing the document to a particular department of an organization if particular keywords are found, flagging the document for OCR or other processing if particular keywords are found; prioritizing further actions based on the keywords found, archiving the document in an archive which is indexed according to the keywords found, combinations thereof, and the like.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for recognizing character strings which correspond to keywords without having to detect or identify the individual characters making up the strings.

Without intending to limit the scope of the exemplary embodiment the following example demonstrates the effectiveness of the exemplary method in a word spotting application.

EXAMPLE

The exemplary feature extraction method (Method A) was compared with three existing methods for characterizing word images (designated Methods B, C, D) in handwritten documents using the same statistical model. Method A was performed using the exemplary default values provided in Table 1 and Split Type II. Methods B, C, and D, generally correspond to those described in the following references:

Method B: See Marti and Bunke.

Method C: VINCIARELLI, A., S. BENGIO, and H. BUNKE, Offline Recognition of Unconstrained Handwritten Texts using HMMs and Statistical Language Models, *IEEE Transactions on Pattern Analysis and Machine Intelligence*. 26 (6), pp 709-720 (2004).

Method D: RATH, T. M. and R. MANMATHA, ISSN 0-7695-1960-1, Features for Word Spotting in Historical Manuscripts, pp 218 (2003), in particular, the features presented in section 4.2 "Feature Sets."

Word spotting, as previously noted, is the task of detecting the presence of certain words without directly using character recognition techniques. For this task, the characterization of a word image can be crucial and can dramatically impact the detection performance.

The experiments are carried out on a database consisting of real scanned letters (handwritten correspondence, in the French language). The database used is especially challenging because of the variability of writers, styles, artifacts and other anomalies such as spelling mistakes. Pre-processing segmentation processes are carried out on 630 of such letters to obtain a set of word image hypotheses. The ten most frequent words are extracted from these letters as exemplary "keywords". These ten words (and the associated number of occurrences) include the words contrat (514) and veuillez (303). Hidden Markov models (HMMs) are trained for each word and the performance of the word detectors is evaluated for all the compared features.

Training and testing is carried out using N-fold cross validation with N=5 folds. This means that the letters are divided into 5 equal-sized randomly generated sets (the folds). The samples from 4 of the folds are used for training and the remaining set is used for testing.

Given a word to detect, each of the testing samples can belong to a positive or to a negative class. It is positive if it has the same identity as the word to be detected, and it is negative otherwise. The HMM associates a score to each image depending on how likely it is to be the searched word. In such a situation, a threshold is set to make a decision.

Errors can be then classified in terms of false rejection FR (these are positive samples with a score below the threshold) and false acceptance FA (these are negative samples with scores above the threshold). One way of characterizing the performance of the system is to plot FR versus FA, for example, on a Detection Error Tradeoff (DET) curve, as described, for example, in MARTIN, A., et al., The DET Curve in Assessment of Detection Task Performance. pp 1895-1898 (1997). In such curves, it can be observed that there is a tradeoff between FR and FA. In some applications, it may be considered more important to avoid false negatives than to miss correct words. Accordingly, a reasonable FR rate is selected and the performance evaluated in terms of the lowest FA rates. The DET curves for the words "veuillez" and "contrat" are provided in FIGS. 7 and 8. The plot A in each case is obtained with the present method, while plots B, C, and D are for the comparative methods.

Figure 7:
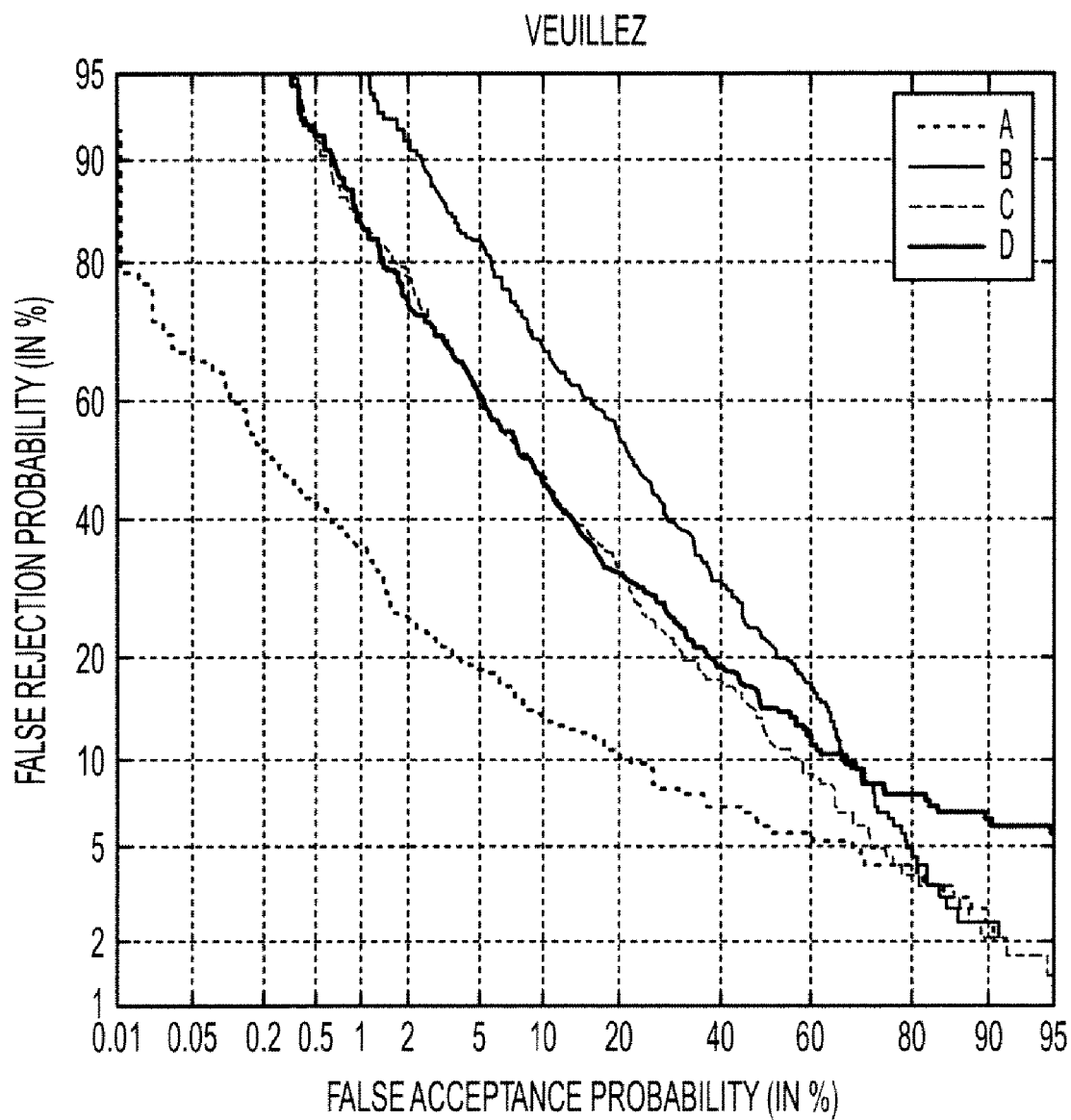
FIG. 7 illustrates detection error tradeoff plots for detection of the French word "veuillez" in a set of documents by the exemplary method (A) and three different conventional methods (B, C, D)
Figure 8:
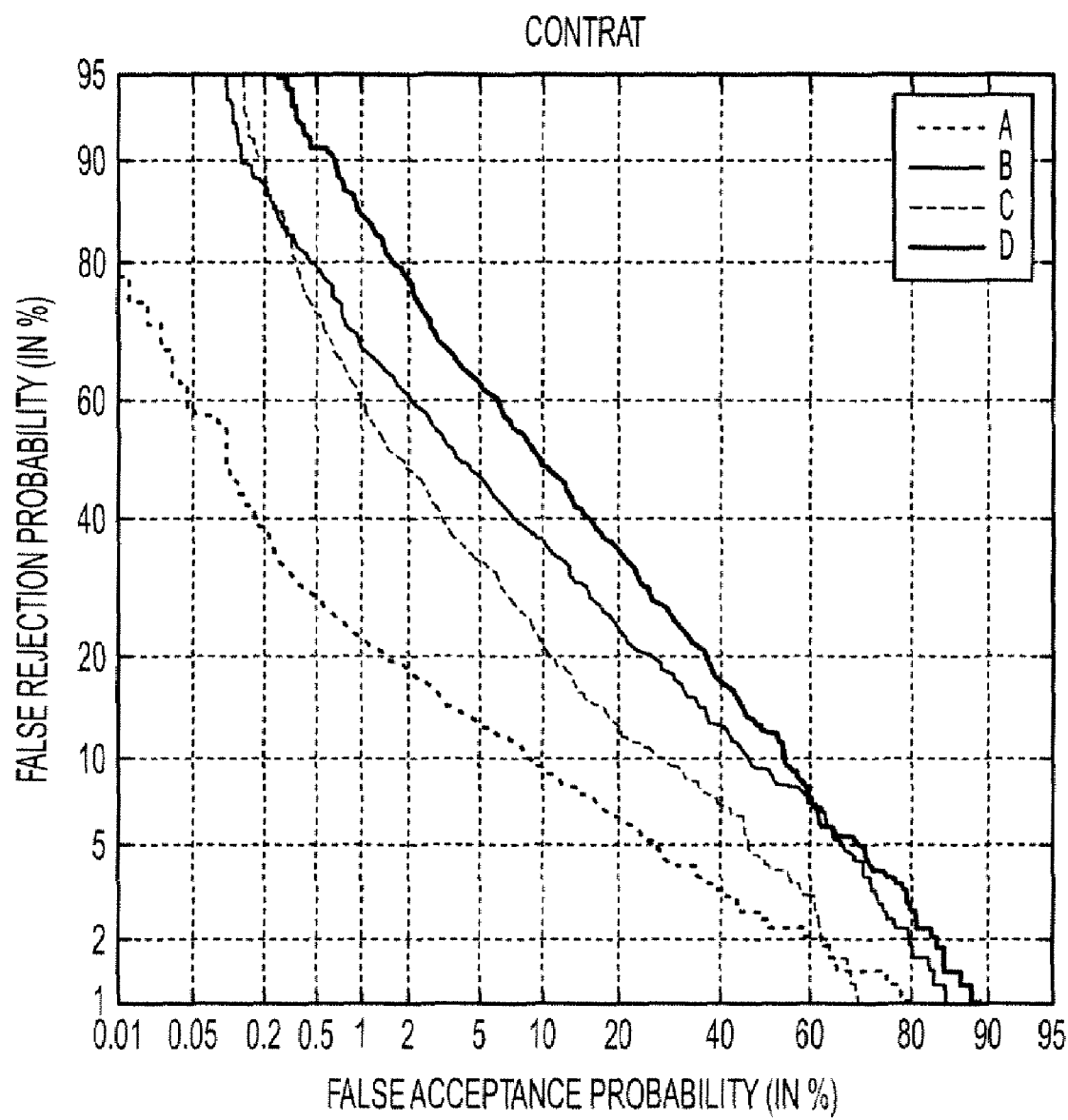
FIG. 8 illustrates detection error tradeoff plots for detection of the French word "contrat" in the set of documents by the exemplary method (A) and three different conventional methods (B, C, D).

As can be seen from FIGS. 7 and 8 (and evident for the other eight words tested, which are not illustrated here), the features of the present method obtained by subdividing a sliding window, yield significantly better FA in all cases for most of the FR range. At FR=50%, for example, the FA of the exemplary features is more than 3 times lower than that of the best compared feature (in a couple of instances, a factor of 10 times better). The results for the present method were obtained using the split type II (fitted & regularly split into M*N cells). This split was found to be superior in performance to the other split types I and III for this application.

To measure the performance of each system with a single number, the area under the curve (AUC) can be computed. The AUC is a measure of the area under the precision-recall plot. A higher AUC is generally indicative of higher performance. Table 2 provides the AUC averaged over the ten words for the method A, B, C, and D

TABLE 2

Evaluation of the Performance of Four methods

| Method | Mean AUC |
| --- | --- |
| A (exemplary) | 0.950 |
| B (comparative) | 0.852 |
| C (comparative) | 0.895 |
| D (comparative) | 0.797 |

The difference in AUC between the exemplary method and the state of the art features is significant. The exemplary method had the highest mean AUC for the words tested.

As for the above methods, recognition methods for automatically identifying word classes from word images generally depend on the mathematical representation of a word image. Statistical pattern recognition methods usually characterize a word image with a sequence of features vectors. The capability of a set of features to preserve information about a word identity while being robust to various sources of variability, such as the writing style or the type of pen, will impact the accuracy independently of the classifier used for recognition.

The exemplary method described herein provides a novel approach to characterize word images using histograms of gradient directions extracted from different regions of a sliding window. The advantage of this representation with respect to currently-accepted representations is demonstrated in these experiments.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of characterizing a word image comprising:
    traversing the word image stepwise with a window to provide a plurality of window images;
    for each of the plurality of window images:
        splitting the window image to provide a plurality of cells, wherein when only a portion of the window image contains active pixels, the splitting comprises splitting only a rectangular area in the window image containing the active pixels into an array of cells, whereby a portion of the window image containing no active pixels is excluded from the splitting;
        extracting a feature from each of the plurality of cells, the feature comprising a gradient orientation histogram; and
    characterizing the word image based on the features extracted from the plurality of window images; and
    wherein the method is performed using a computer or processor.

2. The method of claim 1, further comprising:
    for each window image, determining a features vector based on the extracted features of each of the plurality of cells; and
    characterizing the word image based on the features vectors of the plurality of window images.

3. The method of claim 2, wherein the computing of the features vector comprises concatenating the extracted features.

4. The method of claim 1, wherein the array comprises an M×N array where N is a number of cells arranged in a horizontal direction and M is a number of cells arranged in a vertical direction.

5. The method of claim 4, wherein M is at least 2 and N is at least two.

6. The method of claim 1 wherein the cells are rectangular.

7. The method of claim 1, wherein the cells of a window image are of the same size.

8. The method of claim 1, wherein the extraction of a feature comprises computing a gradient direction histogram for the pixels in the cell.

9. The method of claim 1, wherein the word image comprises a bitmap acquired by segmenting a document image.

10. The method of claim 1, wherein the word image is characterized without characterization of individual characters of a character string within the word image.

11. A computer program product embodied on a non-transitory recording medium encoding instructions, which when executed on a computer causes the computer to perform the method of claim 1.

12. A processing system which executes instructions stored in memory for performing the method of claim 1.

13. A method of characterizing a word image comprising:
    traversing the word image stepwise with a window to provide a plurality of window images;
    for each of the plurality of window images:
        splitting the window image to provide a plurality of cells;
        extracting a feature from each of the plurality of cells, comprising computing a gradient direction histogram for the pixels in the cell, comprising computing a gradient magnitude m and direction θ for each pixel with coordinates (x,y) in the cell as:

$$m(x, y) = \sqrt{G_x^2 + G_y^2}$$

$$\theta(x, y) = a\tan2\left(\frac{G_y}{G_x}\right),$$

where atan2 is a function that gives the angle of the vector ($G_x$, $G_y$) in the range [−π,π]; and
    characterizing the word image based on the features extracted from the plurality of window images.

14. The method of claim 13, wherein the splitting the window image comprises splitting at least a portion of the window image into an array of cells.

15. The method of claim 14, wherein the portion of the window image that is split into cells bounds at least the active pixels in the window image.

16. A computer program product embodied on a non-transitory recording medium for encoding instructions, which when executed on a computer causes the computer to perform the method of claim 13.

17. A processing system which executes instructions stored in memory for performing the method of claim 13.

18. A method of characterizing a word image comprising:
traversing the word image stepwise with a window to provide a plurality of window images;
for each of the plurality of window images:
splitting the window image to provide a plurality of cells;
extracting a feature from each of the plurality of cells, the feature comprising a gradient orientation histogram; and
for each window image, computing a features vector based on the extracted features of each of the plurality of cells, wherein the computing of the features vector comprises concatenating the extracted features and normalizing the features vector such that all of the component values sum to a fixed value;
characterizing the word image based on the features vectors of the plurality of window images; and
wherein the method is performed using a computer or processor.

19. A computer program product, embodied on a non-transitory recording medium, encoding instructions, which when executed on a computer causes the computer to perform the method of claim 18.

20. A processing system which executes instructions stored in memory for performing the method of claim 18.

21. A method of characterizing a document image comprising:
segmenting the document image to identify word images;
for an identified word image, traversing the word image stepwise with a window to provide a plurality of window images;
for each of the plurality of window images:
splitting the window image to provide a plurality of cells;
extracting a feature from each of the plurality of cells comprising computing a gradient direction histogram for the pixels in the cell; and
computing a features vector based on the extracted features;
normalizing the features vector such that all of the component values sum to a fixed value;
characterizing the word image based on the features vectors of the plurality of window images; and
characterizing the document based on the characterization of at least one of the identified word images;
wherein the method is performed using a computer or processor.

22. The method of claim 21, further comprising classifying the characterized word image with a classifier trained to identify a keyword.

23. The method of claim 22, wherein the document image is an image of a handwritten document.

24. A computer program product, embodied on a non-transitory recording medium, encoding instructions, which when executed on a computer causes the computer to perform the method of claim 21.

25. A processing system which executes instructions stored in memory for performing the method of claim 21.

26. A processing system comprising:
a document segmentor which processes an input document image to identify word images;
a features extractor which extracts features of an identified word image and computes features vectors therefrom, the features extractor executing instructions for traversing the word image stepwise with a window to provide a plurality of window images and, for each of the plurality of window images,
excluding from splitting, a region of the window image having no active pixels, splitting a remaining portion of the window image comprising active pixels to provide an M×N array of cells where N is a number of cells arranged in a horizontal direction and M is a number of cells arranged in a vertical direction, and where N and M each have the same value for each of the window images,
extracting a feature from each of the plurality of cells, and
computing a features vector based on the extracted features; and
a classifier which classifies the word image based on the computed features vectors of the window images.

27. The processing system of claim 26, wherein the classifier comprises a hidden Markov model trained to identify at least one keyword.

* * * * *